C. C. HARMON.
AIR SEAL LOCK PNEUMATIC INNER TUBE.
APPLICATION FILED MAR. 2, 1922.

1,432,333. Patented Oct. 17, 1922.

Inventor:
Chester C. Harmon

Patented Oct. 17, 1922.

1,432,333

UNITED STATES PATENT OFFICE.

CHESTER C. HARMON, OF PORTLAND, MAINE.

AIR-SEAL-LOCK PNEUMATIC INNER TUBE.

Application filed March 2, 1922. Serial No. 540,545.

*To all whom it may concern:*

Be it known that I, CHESTER C. HARMON, a citizen of the United States, residing at Portland, in the county of Cumberland and State of Maine, have invented a new and useful Improvement in Air-Seal-Lock Pneumatic Inner Tubes, of which the following is a specification.

My invention relates to a new principle in pneumatic tire construction, and particularly to the design of that part of the tire upon which dependence is placed to maintain the proper shape and solidarity of the whole tire structure.

My object is to overcome, so far as possible, the inconvenience and delay caused by the puncture or injury of an inner tube of a tire while a motorist is on the road, together with the expense incident to repairs or replacement of a whole inner tube.

With the ordinary, one-piece inner tube, repairs become necessary at once, when a puncture of the tube takes place, to prevent injury to the shoe or casing occasioned by driving on a deflated tire.

I am cognizant of the fact that numerous attempts have been made, heretofore, by inventors, to remedy this condition by substituting for the one piece, one air chamber inner tube, a tube having numerous compartments or air spaces; and also by sectional construction, using solid masses of pliable material with cored places or recesses for air with which to supply the proper resiliency.

Figure 1:
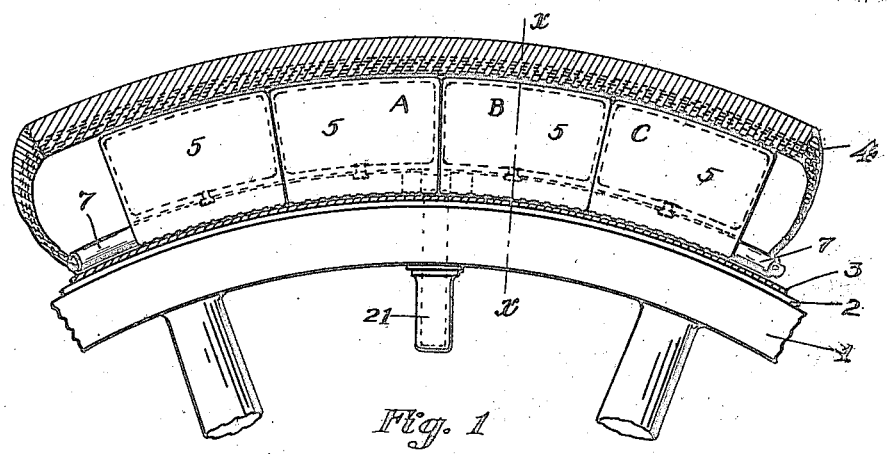
Figure 2:
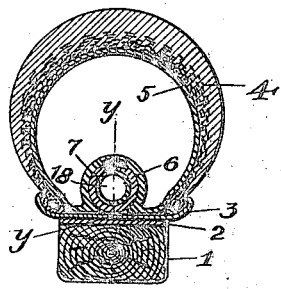
Figure 4:
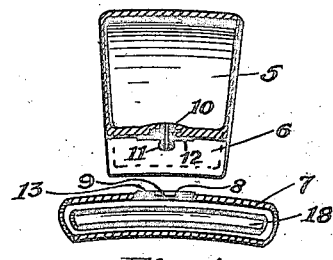
Figure 3:
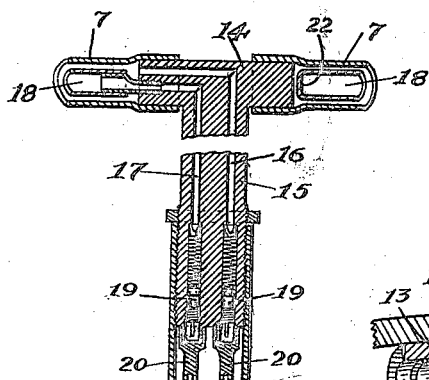
Figure 6:
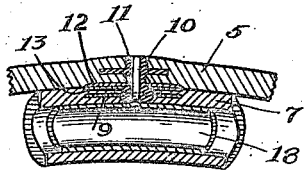
Figure 5:
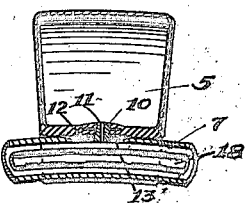

By reference to the drawing accompanying this specification it will be seen that Fig. 1 represents a vertical lengthwise section through the shoe of a pneumatic tire, exposing parts of my inner tube shown in full lines; Fig. 2 is a cross section of the whole tire, rim, and felly of a wheel, taken on line x—x, Fig. 1; Fig. 3 is a section of the T member, through which air is forced into inner tube units, showing method of connecting the air duct and sealing tubes to outside source of air inflation; Fig. 4 is a vertical lengthwise section through inner tube unit, taken on line y—y, Fig. 2, and shows the inner tube unit ready to be placed in position on air duct, which latter is also shown in section; Fig. 5 shows the operation started in Fig. 4, completed, and Fig. 6 illustrates, in section, position of the several parts after inner tube units have been inflated and sealing tube performing its function of closing air passage into inner tube unit.

Similar numerals refer to similar parts throughout the several views.

In Fig. 1, 1 is the felly of a wheel, 2 the felly band, and 3 the rim or tire iron. Mounted on rim is casing or shoe 4. Within shoe 4 are several independent, detachable, self contained and closed-end rubber tubes 5. These tubes, or tubular units, as I shall hereinafter refer to them, are shown inflated and with ends abutting. On the inner circumference of these tubular units, as seen in Fig. 2, there is a depression 6, extending upwardly into the body space of unit, and enclosing a tubular member, or air-duct, as it will hereinafter be referred to, 7, which latter extends nearly around the whole circumference of rim 3. Opening out of the outer periphery of air-duct 7, at spaced intervals are holes 8, reinforced by perforated metal plates 9. Registering with these holes (8), are other holes 10, out of inner walls of tubular units 5.

Into these holes (10) are secured spring tubular eyelets or fasteners 11, the function of which is to lightly secure tubular units 5 to air-duct 7. On the inner wall of 5, at 12, and on the outer wall of 7, at 13, are adhesive washers or patches. As will be seen by referring to Fig. 4, when tubular unit 5 is placed on air-duct 7, 11 will register with 8, and when the former is lightly pressed into latter a union of the two will take place. In like manner the adhesive surfaces of 12 and 13 will adhere and conduce to a tight joint between 5 and 7, and around eyelet member 11, as seen in Fig. 6.

Referring to Fig. 3, 14 is a T shaped member, the lower arm of which, 15, extends from outside of felly of wheel to the two ends of air-duct 7, with air-tight connections. Within this T member are two air passages, 16 and 17,—the former connecting with interior of air-duct 7 and the latter with interior of flexible sealing tube 18. Proper air checks, 19, are placed at the mouth of each air passage in 15, with caps 20 sealing the checks and cover 21 protecting the whole combination.

It is understood, of course, that the tubular units 5 extend around, and when properly inflated, entirely fill the interior of shoe 4, so that to all intents and purposes the combination of individual units acts as a single, one-piece inner tube would, so far as giving proper resiliency to the whole tire is concerned. It will be noticed, too, that sealing tube 18 has a closed or blind end at 22, and that normally this tube is smaller, in outside diameter than the inside diameter of air-duct 7.

Now in operation, caps 20 being removed, an air pump is attached to air passage 16, compressing the air inside of air-duct 7 and passing into tubular units 5 through tubular eyelets or fasteners 11, raises the pressure in all tubular units to the proper degree. Having done this, during which process the sealing tube 18 will have been somewhat collapsed, the pump is detached from air passage 16 and transferred to air passage 17, when a pressure several pounds higher than that obtaining in tubular units 5 is applied to sealing tube 18. This will have the effect of forcing the wall of the sealing tube 18 outwardly against the inner wall of air-duct 7, and consequently across, and slightly into, the mouth of hollow eyelet member 11, thus sealing the only avenue of escape of air from tubular units 5.

In case of a puncture or injury to one of the tubular units,—for instance the one marked B, Fig. 1,—this one will collapse, and as all units are constructed of a very pliable, flexible material, the space this injured unit originally occupied will be filled by the expanding of the adjoining units, A and C. While this will reduce the pressure in these two, and possibly a few next adjoining tubular units, it will not be sufficient to produce a condition making it necessary to effect immediate repairs to the disabled unit, as these affected units or sections will be but slightly deflated, and a run to his destination can be made by the motorist without danger of damaging the tire.

In making a repair to a punctured or injured tubular unit the whole system is first deflated, the injured unit pulled off the air-duct and a new unit put in place, and then the whole inflated.

Having thus described my invention I claim:

1. In an air seal lock pneumatic inner tube, consisting of several short, closed-end tubular members or units, which are to be enclosed in the shoe or casing of a tire, said units to completely fill the shoe when they are properly inflated and placed with ends abutting; a tubular air-duct or carrier impinging on inner circumference of units and ends of said air-duct meeting in a member through which air is forced, from outside source, into said air-duct; tubular eyelets or fasteners mechanically securing each tubular unit to the air-duct or carrier, and through which air, under more than atmospheric pressure, may be admitted to said units from said air-duct; means for hermetically joining said tubular units to said air-duct by a plastic, adhesive material in close proximity to, and surrounding, said tubular eyelets, to retain air within the units and air-duct and prevent egress of air around outside of said tubular eyelets while the units are being inflated; a flexible tubular member or sealing tube inserted within the aforesaid tubular air-duct, the said sealing tube to have one blind or closed end and an open end directly connected to outside source of air inflation; means for supplying a pressure in said sealing tube in excess of that used to inflate the tubular units, whereby this excess pressure will expand the wall of the said sealing tube against the openings for air in said tubular eyelets, thus constituting a seal against leakage of air from, or reduction of pressure in, tubular units; means provided for admitting air under more than atmospheric pressure to both tubular air-duct and sealing tube and retaining means for holding said pressures within said members.

2. In an air seal lock pneumatic inner tube, consisting of a hollow member bent into a circle, thus forming a tubular ring, with both ends connected to a T shaped member through which air may be forced into said tubular ring; said T shaped member to be accessible when inner tube parts are assembled in a shoe or casing of a tire and the whole mounted on a wheel, and to have proper check valves to resist the return of air and consequent lowering of pressure within ring, when inflating of inner tube is being done; a plurality of attachable, detachable and closed-end tubular members, subject to and capable of resisting ordinary tire pressures, mounted upon said tubular ring; interiors of both closed-end tubes and tubular ring to be communicable through perforations made in latter at spaced intervals registering with similar openings in former; mechanical means for lightly tying the closed-end tubes to tubular ring, and means for hermetically joining same to prevent leakage of air around mechanical tying member; a flexible sealing tube, with one closed end, inserted in tubular ring and subject to a greater air pressure than that which obtains in inflating closed-end tubes, whereby walls of this sealing tube may be forced outwardly against the openings from tubular ring to closed-end tubes, thereby constituting a seal to prevent air escaping from closed-end tubes subsequent to being inflated, substantially as described.

CHESTER C. HARMON.